US011737118B2

(12) United States Patent
Tabet et al.

(10) Patent No.: US 11,737,118 B2
(45) Date of Patent: *Aug. 22, 2023

(54) SYSTEM INFORMATION SIGNALING FOR LINK BUDGET LIMITED WIRELESS DEVICES

(71) Applicant: Apple Inc., Cupertino, CA (US)

(72) Inventors: Tarik Tabet, Los Gatos, CA (US);
Farouk Belghoul, Campbell, CA (US);
Awais M. Hussain, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,770

(22) Filed: Jul. 1, 2022

(65) Prior Publication Data
US 2022/0338181 A1  Oct. 20, 2022

Related U.S. Application Data

(63) Continuation of application No. 14/980,710, filed on Dec. 28, 2015, now Pat. No. 11,382,080.
(Continued)

(51) Int. Cl.
*H04W 72/04* (2023.01)
*H04W 48/16* (2009.01)
(Continued)

(52) U.S. Cl.
CPC .......... *H04W 72/23* (2023.01); *H04W 48/12* (2013.01); *H04W 48/16* (2013.01)

(58) Field of Classification Search
CPC ............................ H04W 72/042; H04W 48/16
See application file for complete search history.

(56) References Cited

U.S. PATENT DOCUMENTS 8,412,211 B2   4/2013  Petrovic
8,724,448 B2   5/2014  Roessel
(Continued)

FOREIGN PATENT DOCUMENTS

CN   102624489   8/2012
CN   103621146   3/2014
(Continued)

OTHER PUBLICATIONS

First Office Action for DE Patent Application No. 112016000304.8, 17 pages; dated Jun. 22, 2021.
(Continued)

*Primary Examiner* — Luat Phung
(74) *Attorney, Agent, or Firm* — Kowert, Hood, Munyon, Rankin & Goetzel, P.C.

(57) ABSTRACT

This disclosure relates to providing system information for cell access to link budget limited devices. According to some embodiments, a base station may transmit a master information block (MIB), a first system information block (SIB), and second SIBs. The first SIB and the second SIBs may be configured for different device categories, and may accordingly have different characteristics. For example, the first SIB may be configured for link budget limited devices, and may include information specific to such devices and/or may exclude information not relevant to such devices or not critical to accessing the cell. In some instances, the first SIB may also include information from the MIB, such that at least some devices may be able to decode the first SIB and gain cell access without decoding the MIB.

20 Claims, 6 Drawing Sheets

Related U.S. Application Data (60) Provisional application No. 62/101,924, filed on Jan. 9, 2015.

(51) Int. Cl.
*H04W 72/23* (2023.01)
*H04W 48/12* (2009.01)

(56) References Cited

U.S. PATENT DOCUMENTS

| | | | |
|---|---|---|---|
| 8,885,560 | B2 | 11/2014 | Wallen et al. |
| 9,078,253 | B2 | 7/2015 | Li |
| 9,198,158 | B2 | 11/2015 | Knauft |
| 10,104,686 | B2 | 10/2018 | Petermann |
| 2006/0252377 | A1 | 11/2006 | Jeong |
| 2010/0022250 | A1 | 1/2010 | Petrovic |
| 2010/0265899 | A1 | 10/2010 | Du |
| 2011/0019615 | A1 | 1/2011 | Krco |
| 2011/0110296 | A1 | 5/2011 | Malladi |
| 2011/0149827 | A1 | 6/2011 | Na |
| 2011/0255486 | A1 | 10/2011 | Luo |
| 2012/0063321 | A1 | 3/2012 | Chandrasekhar |
| 2013/0064119 | A1 | 3/2013 | Montojo |
| 2013/0208677 | A1 | 8/2013 | Lee |
| 2013/0301552 | A1 | 11/2013 | Xu |
| 2014/0044056 | A1 | 2/2014 | Chen |
| 2014/0057634 | A1 | 2/2014 | Chang |
| 2014/0155109 | A1 | 6/2014 | Vaidya |
| 2014/0198685 | A1 | 7/2014 | Xu |
| 2014/0198726 | A1 | 7/2014 | Xu |
| 2014/0243026 | A1 | 8/2014 | Essignmann |
| 2014/0293946 | A1 | 10/2014 | Suzuki |
| 2014/0307621 | A1 | 10/2014 | Frenger |
| 2014/0307697 | A1 | 10/2014 | Beale |
| 2014/0334372 | A1 | 11/2014 | Vos |
| 2015/0029905 | A1* | 1/2015 | Yi .................. H04L 1/1854 370/277 |
| 2015/0085717 | A1* | 3/2015 | Papasakellariou .... H04W 48/12 370/280 |
| 2015/0126206 | A1 | 5/2015 | Krishnamurthy |
| 2015/0139175 | A1 | 5/2015 | Ratasuk |
| 2015/0173039 | A1 | 6/2015 | Rune |
| 2015/0181575 | A1 | 6/2015 | Ng |
| 2015/0223148 | A1 | 8/2015 | Shi |
| 2015/0296482 | A1 | 10/2015 | Baskar |
| 2015/0327155 | A1* | 11/2015 | Lee .................. H04W 76/14 370/329 |
| 2015/0341911 | A1 | 11/2015 | Wakabayashi |
| 2015/0365968 | A1* | 12/2015 | Kim .................. H04L 5/14 370/280 |
| 2015/0382284 | A1 | 12/2015 | Brismar |
| 2016/0050643 | A1 | 2/2016 | Pudney |
| 2016/0134403 | A1 | 5/2016 | Xiong |
| 2016/0164653 | A1 | 6/2016 | Wang |
| 2016/0183231 | A1* | 6/2016 | Shi .................. H04L 1/08 370/329 |
| 2016/0212686 | A1 | 7/2016 | Viorel |
| 2016/0269872 | A1* | 9/2016 | Kim .................. H04W 4/20 |
| 2016/0315752 | A1 | 10/2016 | Chen |
| 2016/0353440 | A1* | 12/2016 | Lee .................. H04W 74/0833 |
| 2016/0360551 | A1 | 12/2016 | Bergman |
| 2017/0048802 | A1* | 2/2017 | Bucknell .............. H04W 76/27 |
| 2017/0064764 | A1 | 3/2017 | Ke |
| 2017/0201915 | A1 | 7/2017 | Decarreau |
| 2017/0230876 | A1 | 8/2017 | Suzuki |
| 2017/0230951 | A1* | 8/2017 | Xiong ................ H04W 48/12 |
| 2017/0244529 | A1 | 8/2017 | Yu |
| 2017/0289957 | A1 | 10/2017 | Zhang |
| 2017/0311319 | A1 | 10/2017 | Lee |
| 2018/0007543 | A1* | 1/2018 | Lee .................. H04W 72/21 |
| 2018/0014278 | A1* | 1/2018 | Papasakellariou .... H04L 5/0094 |
| 2018/0270634 | A1 | 9/2018 | Kim |

FOREIGN PATENT DOCUMENTS

| | | |
|---|---|---|
| CN | 103621147 | 3/2014 |
| CN | 103828457 | 5/2014 |
| CN | 103999528 | 8/2014 |
| WO | 2009076997 | 6/2009 |
| WO | 2011038243 | 3/2011 |
| WO | 2013131262 | 9/2013 |
| WO | 2013183966 | 12/2013 |
| WO | 2014185659 | 11/2014 |
| WO | 2015143244 | 9/2015 |

OTHER PUBLICATIONS

First Office Action for Chinese Patent Application No. 202010657094. 5; 13 pages; dated Jan. 21, 2022.

Alcatel-Lucent Shanghai Bell "SIB transmission for coverage extension MTC UEs"; 3GPP TSG-WG RAN2#84 R2-140725; Prague, Czech Republic; 5 pages; Feb. 10-14, 2014.

Ericsson "System information for enhanced coverage MTC UEM"; 3GPP TSG-RAN WG1 Meeting #74 R1-133422; Barcelona, Spain; Aug. 19-23, 2013.

International Search Report & Written Opinion, Application No. PCT/US2016/012029, dated Mar. 22, 2016, 16 pages.

Fujitsu, "On support of low-cost MTC terminals with reduced Tx/Rx bandwidths", 3GPP TSG-RAN WG1 Meeting #66, Athens, Greece, Aug. 22-26, 2011, 2 pages.

Office Action, Chinese Application for Invention No. 201680005196. 0, dated Sep. 25, 2019, 12 pages.

* cited by examiner

MASTER INFORMATION BLOCK Message

```
BCCH-BCH-Message
    MasterInformationBlock
        MasterInformationBlock [0] BCCH-BCH-Message =
            message =
                dl-Bandwidth = n25
                phich-Config =
                    phich-Duration = normal
                    phich-Resource = one
                systemFrameNumber = 01110110
                spare = 0000000000
        49D800
```

802 — dl-Bandwidth = n25
804 — phich-Config
806 — systemFrameNumber

*FIG. 8*

| # of TX Antennas | PBCH CRC Mask |
|---|---|
| 1 | <0,0,0,0,0,0,0,0,0,0,0,0,0,0,0,0> |
| 2 | <1,1,1,1,1,1,1,1,1,1,1,1,1,1,1,1> |
| 4 | <0,1,0,1,0,1,0,1,0,1,0,1,0,1,0,1> |

SYSTEM INFORMATION SIGNALING FOR LINK BUDGET LIMITED WIRELESS DEVICES

PRIORITY CLAIM INFORMATION

This application is a continuation of U.S. patent application Ser. No. 14/980,710, entitled "System Information Signaling for Link Budget Limited Wireless Devices," filed Dec. 28, 2015, claims priority to U.S. provisional patent application serial number 62/101,924, entitled "System Information Signaling for Link Budget Limited Wireless Devices," filed Jan. 9, 2015, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to a system and method for providing system information for link budget limited wireless devices.

DESCRIPTION OF THE RELATED ART

Wireless communication systems are rapidly growing in usage. Additionally, there exist numerous different wireless communication technologies and standards. Some examples of wireless communication technologies include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication can be useful for a wide breadth of device classes, ranging from relatively simple (e.g., potentially inexpensive) devices which may have limited capabilities, to relatively complex (e.g., potentially more expensive) devices which may have greater capabilities. Such devices may have different characteristics with respect to processing, memory, battery, antenna (power/range, directionality), and/or other capabilities. Devices which exhibit relatively limited reception and/or transmission capabilities (due to device design, current transmission medium conditions, and/or other factors) may be referred to in some instances as "link budget limited" devices.

SUMMARY

Embodiments are presented herein of methods, systems, and apparatuses for providing cell system information for link budget limited devices.

According to the techniques described herein, a base station may transmit a master information block (MIB) and multiple system information blocks (SIBs) including information usable by wireless devices to access a cell provided by the base station. These may include SIBs configured for different device categories, potentially including one or more lower complexity and/or performance device categories (e.g., LTE category 0), which may Be link budget limited some or all of the time, and one or more higher complexity and/or performance device categories (e.g., LTE categories 1-5) which may not be link budget limited, or which may less commonly be link budget limited.

The SIB(s) configured for lower complexity devices may include a subset of the information contained in the other SIBs. For example, a SIB which includes only the most relevant information from the SIBs for higher complexity devices may be generated and provided for the benefit of lower complexity devices.

The SIB(s) configured for lower complexity devices may, in some instances, be transmitted at a predetermined fixed location or locations (resource allocation) of each radio frame transmitted by the base station. Alternatively, such a SIB may be transmitted at a dynamic location in time and/or frequency, in which the resource assignment of the SIB may be indicated using a control channel such as the PDCCH or EPDCCH in LTE.

Additionally (or alternatively), the SIB(s) configured for lower complexity devices may be repeated one or more times (e.g., to provide time and/or frequency diversity), which may provide additional gain to receiving devices, which may be particularly beneficial to link budget limited devices.

If desired, the MIB may also be transmitted multiple times within each radio frame transmitted by the base station, in order to facilitate reception by link budget limited devices. For example, the MIB may be transmitted multiple times within a subframe of a radio frame, and/or transmitted in multiple subframes of a radio frame. Alternatively, or in addition, the information relevant to link budget limited devices contained in the MIB may also be included in the SIB configured for such devices, which may allow such devices to bypass decoding the MIB entirely and instead obtain all of the information needed to access the cell provided by the base station from the SIB(s) configured for such devices.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
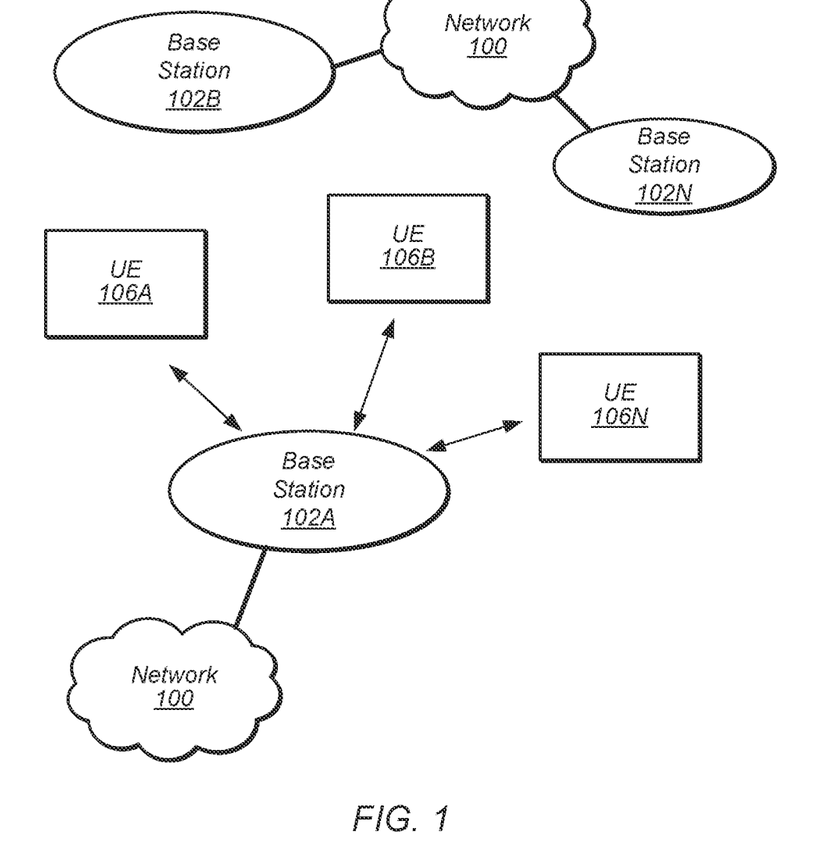
FIG. 1 illustrates an exemplary (and simplified) wireless communication system, according to some embodiments.
Figure 2:
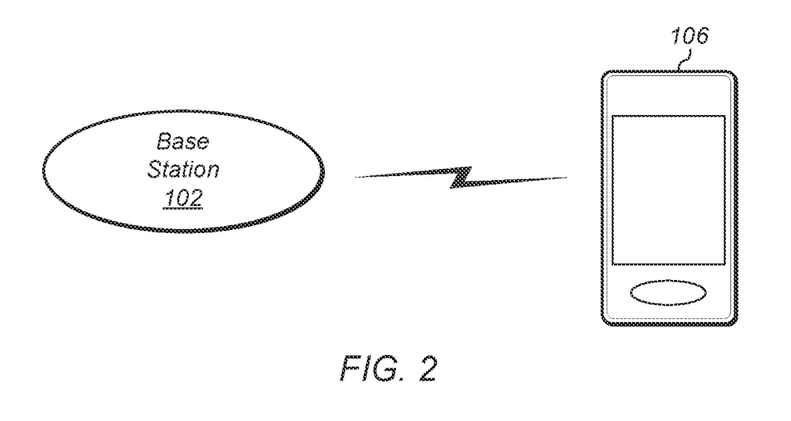
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
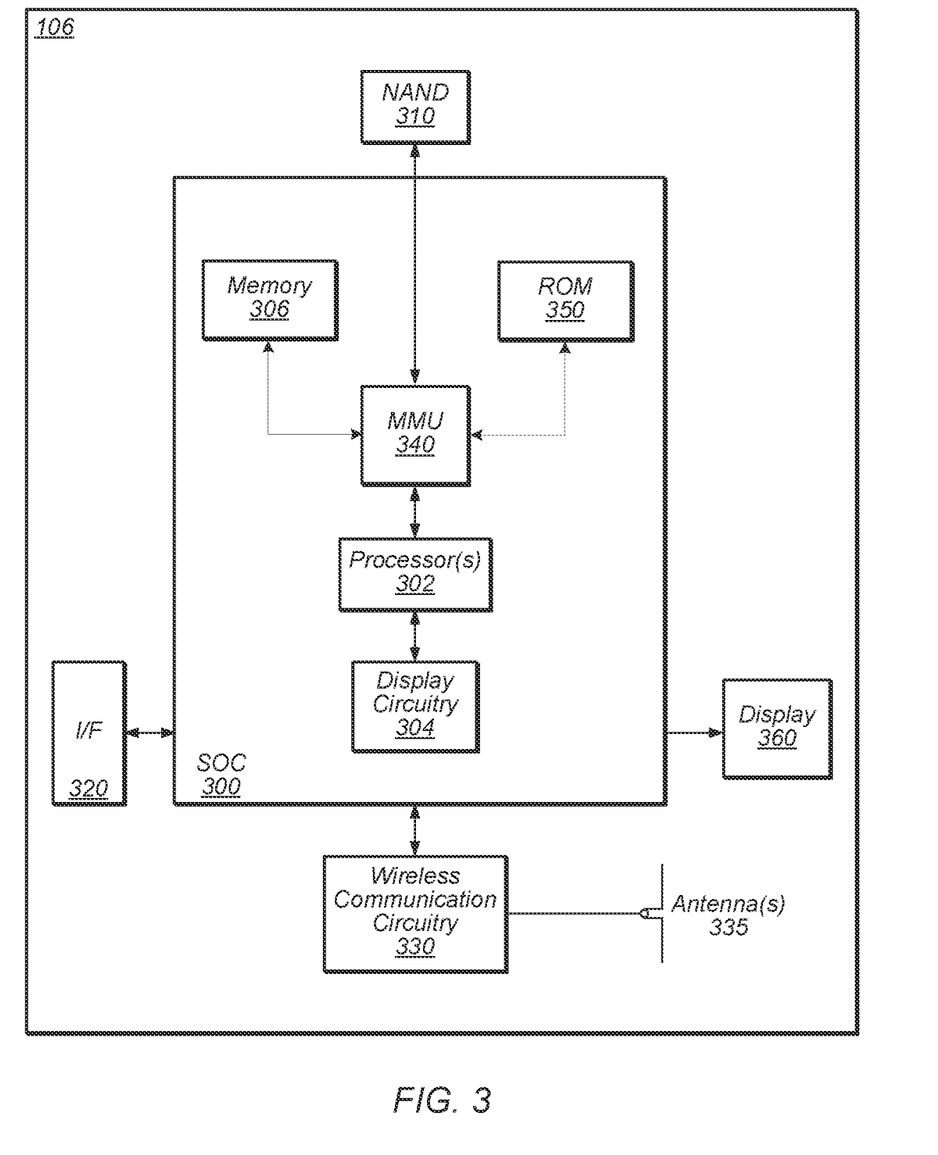
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features described herein, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to imple-ment part or all of the features described herein, such as the features described herein with reference to, inter alia, FIG. 5.

Figure 4:
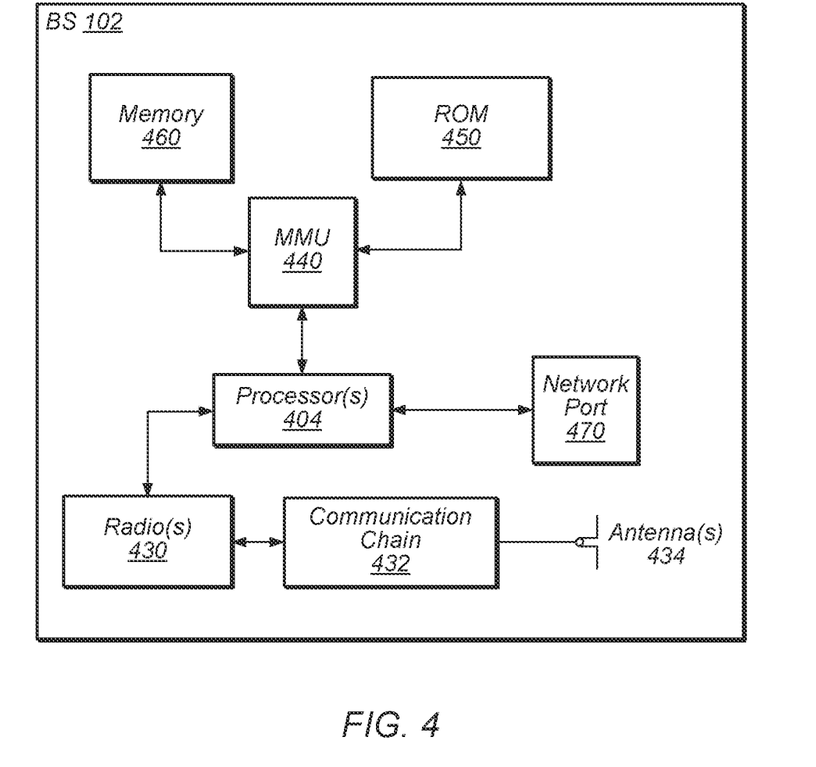
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Figure 5:
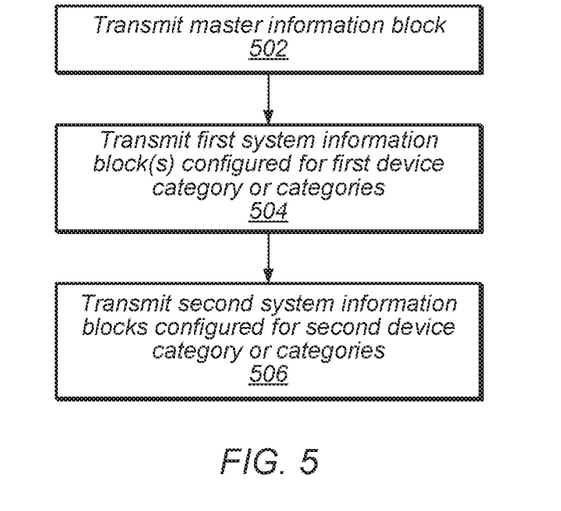
FIG. 5 is a flowchart diagram illustrating an exemplary method for providing system information to link budget limited devices, according to some embodiments.

The BS 102 may include hardware and software components for implementing or supporting implementation of features described herein, such as those described herein with reference to, inter alia, FIG. 5. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein, such as the features described herein with reference to, inter alia, FIG. 5.

FIG. 5—Flowchart

In LTE, the first step for a wireless device wishing to access a cell after cell search/cell acquisition may be decoding of the master information block (MIB) and the system information block(s) (SIBs) of the cell to which access is desired.

The MIB may typically be transmitted on the physical broadcast channel (PBCH), and may include information such as system bandwidth, system frame number (SFN), physical HARQ indicator channel (PHICH) configuration, and the number of transmit antennas used by the system.

The SIBs may typically be mapped onto radio resource control (RRC) system information messages transmitted on the physical downlink shared channel (PDSCH). SIBs may include a variety of information which may range from information necessary to access a cell to information for various cell re-selection procedures, among various other types of information.

Thus, at least a portion of the information in the MIB and SIBs for a cell are essential to a device wishing to access that cell. Accordingly, in order to facilitate cell access by devices (e.g., range constrained devices and/or those in poor RF conditions) which have limited link budgets, particularly as demand grows for inexpensive and limited capability devices, it may be desirable to provide mechanisms to improve the abilities of such devices to decode critical system access information.

FIG. 5 is a flowchart diagram illustrating a method for a base station to provide system information for accessing a cell provided by the base station to wireless devices which takes such considerations into account. Note that while elements of the method of FIG. 5 are described substantially with reference to the LTE wireless communication technology, part or all of the method may be used in conjunction with other wireless communication technologies (e.g., including future revisions to and/or successors of LTE), as desired.

The method shown in FIG. 5 may be used in conjunction with any of the computer systems or devices shown in the above Figures, among other devices. In various embodiments, some of the elements of the scheme shown may be performed concurrently, in a different order than shown, substituted for by other elements, or may be omitted. Additional elements may also be performed as desired. As shown, the scheme may operate as follows.

In 502, the base station may transmit a master information block (MIB). A MIB may be transmitted at a fixed location in each radio frame. For example, as one possibility, the PBCH, which may include the MIB, may be transmitted in subframe 0/slot 1 of the central 6 resource blocks (RBs) of each radio frame (i.e., every 10 ms). In practice, in many systems the contents may often not be modified for substantial periods of time (e.g., on the order of hours), and may thus be repeated over a large number of radio frames. If desired, a network operator may be able to modify the contents more frequently, but in some instances at least a certain minimum number of radio frames (e.g., 4) between modifications to the MIB may be specified.

If desired (e.g., in order to improve the ability of link budget limited devices to decode the MIB, while maintaining legacy wireless devices operability), in addition to repeating the MIB over multiple radio frames, the MIB (and possibly the entire PBCH) may be repeated multiple times within each radio frame. For example, in the time domain, in addition to the transmission in subframe 0, the MIB may be repeated in subframe 5, in the same location in the frequency domain as the PBCH in subframe 0 (e.g., the first 4 OFDM symbols of slot 11 of the 6 central RBs of the cell). As another possibility, in the frequency domain, the PBCH may be repeated using the 5th OFDM symbol of slot 0 and the 5th, 6th, and 7th OFDM symbol of slot 1 of the central 6 RBs. A still further potential repetition may be transmitted using a similar arrangement of slots 10 and 11, if desired.

Thus, in comparison to transmitting the PBCH just once per radio frame, in which case just four repetitions occur per 40 ms, if the PBCH is repeated in both the time and frequency domains as just described, sixteen repetitions may occur per 40 ms, which may provide at least 6 dB gain to receiving devices attempting to decode the PBCH. It should be noted that any number of repetitions within a radio frame may be used (e.g., one or more time domain repetitions, one or more frequency domain repetitions, and/or one or more of each of time and frequency domain repetitions), as desired, with corresponding potential gain benefits.

In 504, the base station may transmit one or more "first" system information blocks (SIBs). The first SIB(s) may be configured for a certain device category or categories. For example, the first SIB may be configured for LTE category 0 devices (and/or a newly defined category such as a 'Category X', among various other possibilities), which may be lower complexity, lower performance, and/or lower capability devices relative to other LTE categories. Alternatively, or in addition, the first SIB(s) may be configured for devices experiencing poor or moderate link quality, potentially regardless of whether the link quality being experienced is due to environmental conditions, device capability/configuration, etc., or any combination thereof.

In 506, the base station may transmit one or more "second" SIBs. The second SIB(s) may also be configured for a certain device category or categories, which may be different than the category or categories for which the first SIB(s) are configured. For example, the second SIB(s) may be configured for LTE categories 1-5 devices (or categories 2-5, among various other possibilities), which may be higher complexity, higher performance, and/or higher capability devices relative to other LTE categories. Alternatively, or in addition, the second SIBs may be configured for devices experiencing moderate or good link quality.

The second SIBs may include a full array of system information spread over multiple SIBs, e.g., to support a wide range of operations possible for a higher capability device experiencing (or capable of experiencing) sufficient link quality. For example, as one possibility the second SIBs may include the following SIBs:

SIB-1 Cell access related parameters and scheduling of other SIBs

SIB-2 Common and shared channel configuration, RACH related configuration are present SIB-3 Parameters required for intra-frequency, inter-frequency and I-RAT cell re-selections SIB-4 Information regarding INTRA-frequency neighboring cells (E-UTRA)

SIB-5 Information regarding INTER-frequency neighboring cells (E-UTRA)

SIB-6 Information for re-selection to INTER-RAT (UTRAN cells)

SIB-7 Information for re-selection to INTER-RAT (GERAN cells)

SIB-8 Information for re-selection to INTER-RAT (CDMA2000)

SIB-9 Information related to Home eNodeB (FEMTO-CELL)

SIB-10 ETWS (Earthquake and Tsunami Warning System) information (Primary notification)

SIB-11 ETWS (Earthquake and Tsunami Warning System) information (Secondary notification)

SIB-12 Commercial Mobile Alert Service (CMAS) information

SIB-13 Contains the information required to acquire the MBMS control information associated with one or more MBSFN areas SIB-14 Extended Access Barring (EAB) information Note that the above-described SIBs are provided as examples only and should not be considered limiting to the disclosure as whole, and that one or more additional SIBS may be used, one or more of the above SIBs may not be used, and/or one or more of the above SIBs may be modified, as desired.

The first SIB(s) may include a subset of the information included in the second SIBs, and may possibly include certain information specific to the device categories for which the first SIB(s) are configured (e.g., information that may not be included in the second SIBs). For example, as one possibility, the first SIB might include certain information from SIB-1, SIB-2, possibly SIB-3, and SIB-14. Additionally, if desired, the first SIB may include EPDCCH configuration information for common search space. Further, if desired, the first SIB may include information relating to repetition of various messages for the device category or categories to which the first SIB is directed, such as repetition factor(s) for paging, physical random access channel (PRACH), and/or random access request (RAR) communications. Thus, it may be the case that the first SIB includes only minimal information needed for initially attaching to the base station; at least in some instances, mobility-related and other information which is not required to attach to the base station may be excluded from the first SIB. In some instances, the first SIB may include information regarding bands/channels that the device category or categories to which the first SIB is directed can use. For example, as one possibility the device category or categories to which the first SIB is directed may utilize narrow bands (e.g., 1.4 MHz, and/or one or more other bandwidths), and information relating to such bands (such as the location(s) of the narrowbands in the system bandwidth, how many narrowbands are supported, etc.) may be provided for the new category of devices.

If desired, the first SIB may also include certain system information which is also contained in the MIB. For example, the system bandwidth and the system frame number can be included in the first SIB. Note that this may allow devices receiving the first SIB to bypass decoding the PBCH (including the MIB) altogether, if desired. For example, the PHICH configuration information may not be relevant to those devices to which the first SIB may be directed, and the number of transmit antennas may be determined by such devices based on the cell-specific reference symbols (e.g., energy detection of the cell-specific reference signal (CRS) position of all TX antennas to detect the number of antennas) in the PBCH region or by way of CRC scrambling mechanisms (such as further described herein below with reference to FIG. 9).

As a specific example, the following fields may be included in the first SIB as one possibility. Such a first SIB may be a concatenation of SIB-1, SIB-2, SIB-14, EPDCCH configuration and paging/RAR/PRACH repetition factor fields configured to allow devices to perform network selection and establish RRC connections.

categoryXAllowed (mandatory): The presence of this field indicates category X UEs are allowed to access the cell.

cellBarred (mandatory): Barred means the cell is barred, as defined in TS 36.304 [4].

cellReservedForOperatorUse (mandatory): As defined in TS 36.304 [4].

csg-Identity (optional): Identity of the Closed Subscriber Group the cell belongs to.

csg-Indication (optional): If set to TRUE the UE is only allowed to access the cell if it is a CSG member cell, ims-EmergencySupport (optional): Indicates whether the cell supports IMS emergency bearer services for UEs in limited service mode.

If absent, IMS emergency call is not supported by the network in the cell for UEs in limited service mode.

intraFreqReselection (mandatory): Used to control cell reselection to intra-frequency cells when the highest ranked cell is barred, or treated as barred by the UE.

multiBandInfoList (optional)

paging/RAR/PRACH repetition factor (mandatory) (can be 3 independent fields if needed)

EPDCCH configuration (mandatory)

plmn-IdentityList (mandatory)

p-Max (mandatory): Value applicable for the cell. If absent the UE applies the maximum power according to the UE capability.

q-QualMin (mandatory): Parameter "Qqualmin" in TS 36.304 [4]. If cellSelectioninfo-v920 is not present, tset (mandatory)

q-QualMinWB (mandatory)

q-RxLevMinOffset (mandatory)

sib-MappingInfo (optional)

si-Periodicity (optional)

si-WindowLength (optional)

systemInfoValueTag (optional)

trackingAreaCode (mandatory)

ac-BarringFactor (mandatory)

ac-BarringForCSFB (Optional).

ac-BarringForEmergency (mandatory)

ac-BarringForMO-Data (mandatory).

ac-BarringForMO-Signalling (mandatory)

ac-BarringForSpecialAC (mandatory)

ac-BarringTime (mandatory)

additionalSpectrumEmission (mandatory).

mbsfn-SubframeConfigList (optional)

multiBandInfoList (optional)

ssac-BarringForMMTEL-Video (optional)

ssac-BarringForMMTEL-Voice (optional)

ul-Bandwidth (mandatory)

ul-CarrierFreq (mandatory)

ul-FreqMax (mandatory)

allowedMeasBandwidth (optional)

cellReselectionInfoCommon (optional)

cellReselectionServingFreqInfo (optional)

intraFreqcellReselectionInfo (optional)

p-Max (optional)

q-Hyst (optional)

q-HystSF (optional)

q-QualMin (optional)

q-QualMinWB (optional)

q-RxLevMin (optional)
s-IntraSearch (optional)
s-IntraSearchP (optional)
s-IntraSearchQ (optional)
eab-BarringBitmap (mandatory)
eab-Category (mandatory)
eab-Common (mandatory)
eab-PerPLMN-List (mandatory)

Note that the first SIB can also be transmitted or spread across multiple SIBs (e.g., similarly to the second SB(s)), if desired. As a further (e.g., alternate) example, the following fields may be included in the first SIB as one possibility. Such a first SIB may also be a concatenation of SIB-1, SIB-2, SIB-14, EPDCCH configuration and paging/RAR/PRACH repetition factor fields configured to allow devices to perform network selection and RRC connections, but may include fewer fields than the previous example.

categoryXAllowed
cellBarred
cellReservedForOperatorUse
paging/RAR/PRACH repetition factor (mandatory)
radioResourceConfigCommon (subset for PDSCH, PUSCH, PUCCH)
ue-TimersAndConstants
ul-CarrierFreq
ul-Bandwidth
EPDCCH configuration (mandatory)
plmn-IdentityList (mandatory)
p-Max
q-QualMin
q-QualMinWB
q-RxLevMinOffset
trackingAreaCode
ac-BarringFactor
ac-BarringForEmergency
ac-BarringForMO-Data
ac-BarringForMO-Signalling
ac-BarringForSpecialAC
ac-BarringTime
additionalSpectrumEmission
eab-BarringBitmap
eab-Category
eab-Common
eab-PerPLMN-List Note that these exemplary first SIB formats are provided as examples only and should not be considered limiting to the disclosure as whole, and that one or more additional fields may be included, one or more of the above fields may not be included, and/or one or more of the above fields may be modified, as desired.

Note that, in some instances, the information regarding the repetition level of the PRACH/RAR/paging may include such information as a new random access radio network temporary identifier (RA-RNTI) for the category or categories of devices to which the first SIB is directed (which may be predetermined implicitly based on the resource used (sequence time/frequency position), or parameters to compute it may be provided in the first SIB), the level of repetition and bundles, and/or the system frame number (e.g., if not read from the MIB). Regarding PRACH repetitions, the base station may need to know the starting SFN of the PRACH repetitions in order to be able to decode them. The base station may need to know the starting point, the cycle, and the number of repetitions. If desired, the number of repetitions and cycle could be predefined in a PRACH configuration, for example in 3GPP TS 36.211.

In some instances, the contents (number and length of fields) of the first SIB may be fixed such that the payload of the first SIB is constant. In order to facilitate decoding by link budget limited devices, quadrature phase shift keying (QPSK), space frequency block codes (SFBC), and a lowest MCS possible (e.g., which may depend on the payload) may be used, if desired. Additionally, the first SIB may be transmitted using the central six RBs of the cell.

Regarding the location of transmission of the first SIB in time, any of multiple options may be used. As a first possibility, a fixed subframe location and repetition pattern (e.g., every radio frame, in which case the receiving device doesn't need to know the SFN for decoding) may be used. For example, subframe 0 and/or 5 of each radio frame (as similarly described as a possibility for the MIB herein above) may be used. In such a case, the 5th OFDM symbol of slot 0 and the 5th, 6th, and 7th OFDM symbol of slot 1 of the central 6 RBs may be used to repeat the PBCH of slot 1, and similarly for slots 10 and 11. In such a scenario, note that the PDCCH/EPDCCH may not be needed to indicate the presence of the first SIB (SI-RNTI) and its resource assignment, since the resource assignment may be fixed (e.g., fixed payload, RB assignment, MCS).

As a second possibility, a dynamic location in time (and possibly in frequency) based on SFN may be used. In such a case, the receiving device may need to first decode the MIB. Then (e.g., if the resource assignment is not fixed) the PDCCH or EPDCCH may include information indicating the MCS, RB assignment, and any other desired information regarding the first SIB to enable receiving devices to decode the first SIB. Alternatively, the resource assignment of the first SIB in the PDSCH may be fixed but simply not transmitted in every frame, in which case the PDCCH or EPDCCH may include just one bit to indicate the presence (or absence) of the first SIB when it is present (or absent) in a given radio frame. Note that in that case the EPDCCH may be transmitted using CRS, e.g., instead of demodulation reference signal (DMRS).

Note that in order to enable coherent combining over a long period, it may be desirable to ensure that the first SIB is not modified over a specified period of time. For example, specification documents may define minimum period of time between modifications to the first SIB (e.g., by defining a value "X" and requiring that the first SIB may only be modified at SFNs for which SFM mod X=0, as one possibility). Alternatively, wireless devices may be paged to inform them of modification of the first SIB, if desired.

Note further that if desired, since the payload of the first SIB may be relatively small, the first SIB may be encoded using a convolutional encoder (e.g., similar to the PBCH) instead of a turbo encoder.

Thus, a wireless device of a device category to which the first SIB is directed (and/or a wireless device for which the first SIB is preferable to the second SIBs due to current link conditions) may, after performing a cell search and acquiring the cell provided by the base station, receive and decode the first SIB from the base station and access the cell using the information included in the first SIB. Depending on the configuration of the cell, the wireless device may also decode the MIB (which may be repeated multiple times within each radio frame) in order to obtain the information needed to access the cell, or may not decode the MIB at all, e.g., instead obtaining SFN, system bandwidth, and/or transmit antenna configuration information from the first SIB. Having obtained the information needed to access the cell from the first SIB (and possibly from the MIB), the wireless device may then be able to access (e.g., attach to, establish an RRC connection with, exchange data with, etc.) the cell.

Figure 6:
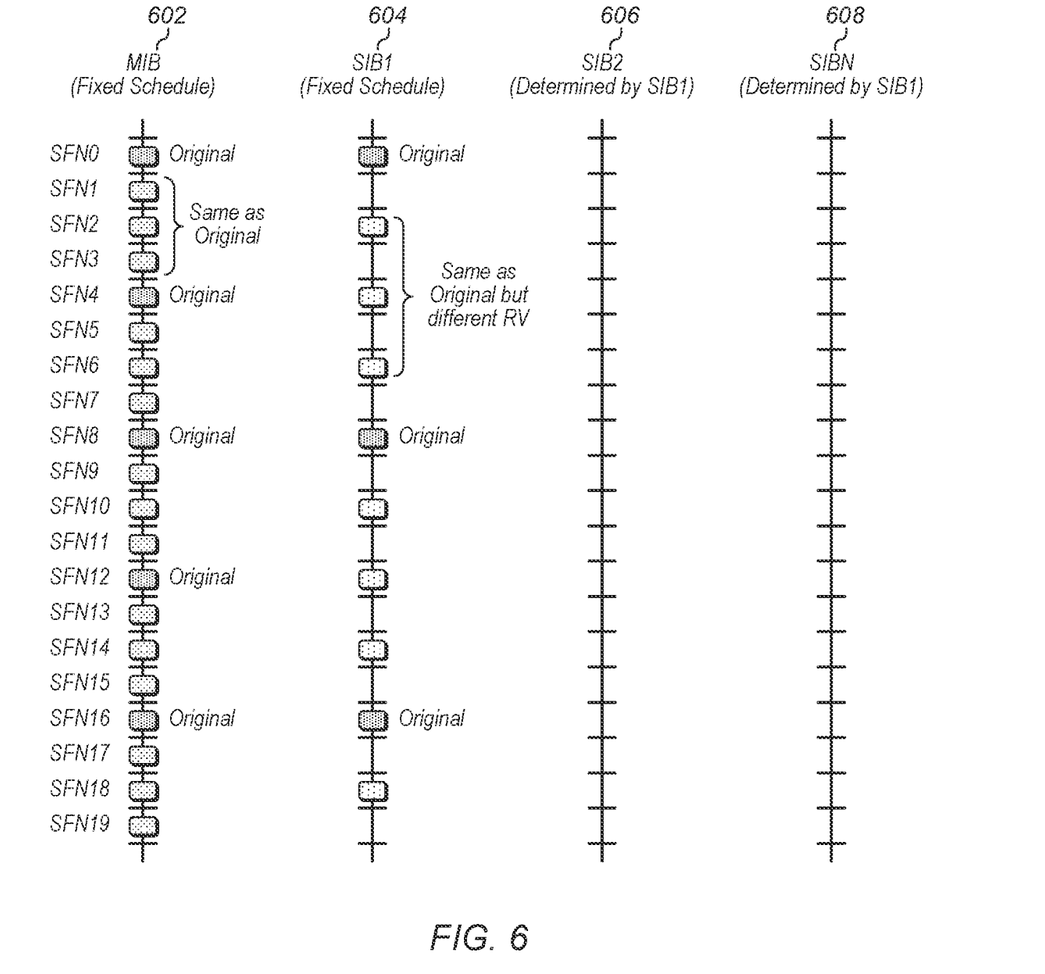
FIG. 6 illustrates an exemplary schedule for transmitting a master information block and system information blocks in a cellular communication system, according to some embodiments.

FIG. 6—Exemplary MIB/SIB Transmission Schedule

FIG. 6 illustrates an exemplary schedule according to which a base station operating according to LTE may currently perform MIB and SIB transmissions according to some embodiments. As illustrated, according to the MIB schedule 602, a MIB may be transmitted in each SFN according to a fixed schedule. A given MIB may be repeated in each of the following three SFNs after its initial transmission, after which a new MIB may be transmitted for the following four SFNs, following which another new MIB may be transmitted for four consecutive SFNs, and so on.

As shown, according to the SIB-1 schedule 604, SIB-1 (i.e., one of the second SIBs) may also be transmitted according to a fixed schedule. Different redundancy versions (RVs) of the same SIB-1 may be transmitted three times (in every other SFN rather than every SFN as with the MIB) after its initial transmission, after which a new SIB-1 may be transmitted using a similar pattern.

The SIB-2 schedule 606 and the schedule for the remaining second SIBs (represented for simplicity by SIB-N schedule 608) may be dynamic, with indications thereof included in the SIB-1. Thus, a receiving device may need to successfully decode SIB-1 in order to be able to decode the remaining second SIBs.

Figure 7:
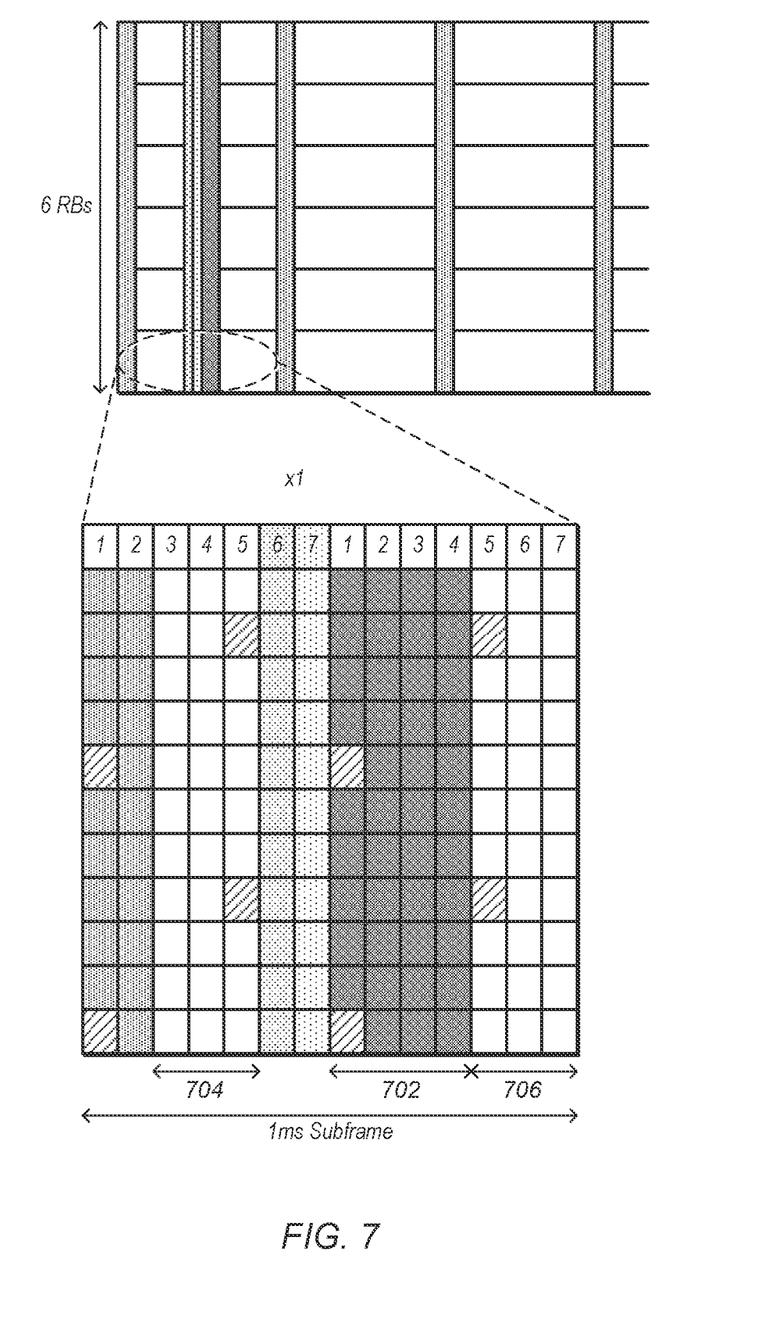
FIG. 7 illustrates exemplary resource distribution of a subframe including a physical broadcast channel in a cellular communication system, according to some embodiments.

FIG. 7—Subframe 0 Resource Distribution

FIG. 7 illustrates an exemplary resource distribution of subframe 0 of a resource block within the central 6 resource blocks of an LTE cell, which may include the PBCH. As shown, OFDM symbols 1-4 of slot 1 702 may be allocated to the PBCH. OFDM symbols 3-5 of slot 0 704 and 5-7 of slot 1 706 are currently available for PDSCH use. As previously described, according to some embodiments of this disclosure, some or all of such symbols may be used to repeat the PBCH, or alternatively, as a fixed location for transmission of the "first" SIB configured for link budget limited devices.

Note that, as also previously described, a similar resource distribution as illustrated could be used for subframe 5 (with or without the additional use of some or all of OFDM symbols 3-5 of slot 10 and 5-7 of slot 11 for PBCH and/or first SIB repetition) of the central 6 resource blocks of each radio frame in order to provide time diversity and increase gain.

Figure 8:
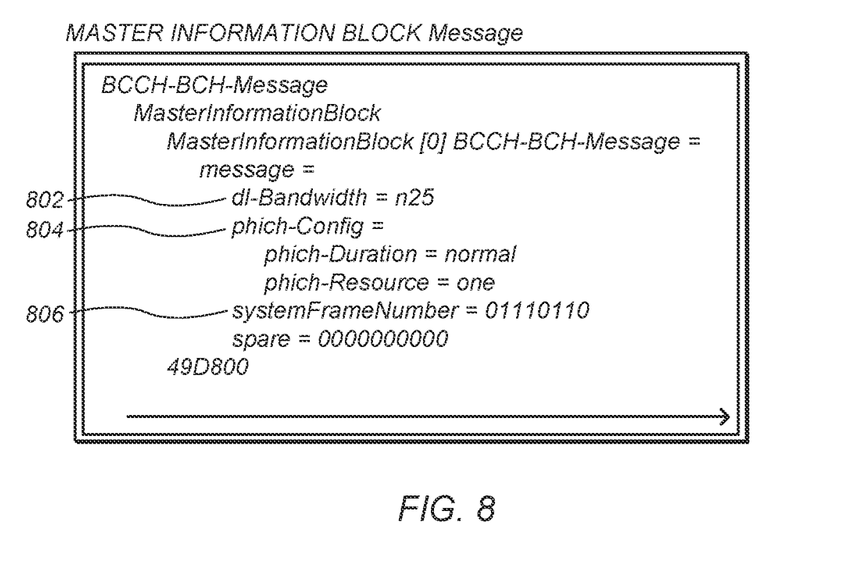
FIG. 8 illustrates an exemplary master information block message, according to some embodiments.
Figure 9:
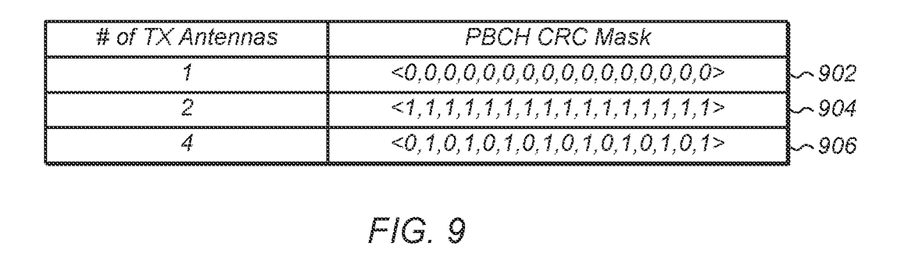
FIG. 9 illustrates an exemplary CRC mask scheme for indicating a number of transmit antennas in a cellular communication system, according to some embodiments.

FIGS. 8-9—Exemplary MIB Format and CRC Mask Scheme

FIG. 8 illustrates an exemplary MIB message format, according to some embodiments. As shown, the message may indicate the cell bandwidth 802, provide PHICH configuration information 804, and indicate the current SFN 806.

FIG. 9 illustrates an exemplary PBCH cyclic redundancy code (CRC) mask scheme which may be used to indicate the number of transmit antennas used in a cell. In particular, the CRC provided as part of the PBCH may be scrambled according to a CRC mask selected based on the number of antennas in the system. Thus, if the system includes 1 TX antenna, the first illustrated CRC mask 902 may be used, while if the system includes 2 TX antennas, the second illustrated CRC mask 904 may be used, and if the system includes 4 TX antennas, the third illustrated CRC mask 906 may be used. Thus, a receiving device may be able to determine the TX antenna configuration of the system depending on which CRC mask of the PBCH checks correctly.

As previously described herein, in some instances the "first" SIB may be used in place of the MIB such that a link budget limited device may not decode the PBCH at all. In such a case, a similar CRC mask scheme may be implemented with respect to the first SIB, which may enable receiving devices to determine the TX antenna configuration of a cell without decoding the MIB.

In the following further exemplary embodiments are provided.

One set of embodiments may include a method for a base station configured to serve a cell, comprising: by the base station: transmitting a master information block (MIB) comprising first information for accessing the cell; transmitting a first system information block (SIB), wherein the first SIB is configured for at least a first device category; and transmitting second SIBs, wherein the second SIBs are configured for at least a second device category.

According to some embodiments, the first SIB is transmitted at a fixed location within each frame transmitted by the base station.

According to some embodiments, the fixed location is within the central six resource blocks (RBs) of the cell.

According to some embodiments, the cell is provided according to LTE, wherein the first device category is LTE category 0.

According to some embodiments, at least a subset of the second SIBs are transmitted at variable locations.

According to some embodiments, the first SIB comprises a subset of information comprised in the second SIBs, wherein the first SIB is configured for a lower complexity device category than the second SIBs.

According to some embodiments, the first SIB comprises information also comprised in the MIB.

According to some embodiments, transmitting the MIB comprises one or more of: repeating transmission of the MIB in multiple subframes of each frame transmitted by the base station; or repeating transmission of the MIB multiple times within a subframe of each frame transmitted by the base station.

According to some embodiments, wherein the first SIB is encoded using convolutional encoding, wherein the second SIBs are encoded using turbo encoding.

A further set of embodiments may include a method for a wireless device, the method comprising: by the wireless device: performing a cell search; acquiring a cell associated with a base station based on the cell search; receiving a first system information block (SIB) from the base station, wherein the first SIB is configured for link budget limited devices, wherein the base station also provides second SIBs configured for devices which are not link budget limited.

According to some embodiments, the first SIB has a fixed resource allocation, wherein at least a subset of the second SIBs have variable resource allocation.

According to some embodiments, the fixed resource allocation is within the central six resource blocks of the cell.

According to some embodiments, the first SIB comprises a subset of information comprised in the second SIBs.

According to some embodiments, accessing the cell based at least in part on information comprised in the first SIB.

According to some embodiments, the base station also transmits a master information block (MIB) comprising first information for accessing the cell, wherein the first SIB also comprises the first information, wherein the wireless device does not attempt to decode the MIB based on receiving the first SIB.

According to some embodiments, the method further includes receiving a master information block (MIB) from the base station, wherein the MIB is repeated by the base station in multiple subframes and/or multiple times within a subframe of each frame transmitted by the base station.

Another set of embodiments may include a wireless device, comprising: a radio; and a processing element operatively coupled to the radio; wherein the radio and the processing element are configured to implement any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a base station that serves a cell, during a first period of time comprising a plurality of radio frames transmitted by the base station:
transmitting a master information block (MIB) comprising first information for accessing the cell, wherein the MIB indicates a location of a first system information block (SIB) of a first set of SIBs, the first SIB comprising at least one field of a SIB-1 of a second set of SIBs and at least one other field, wherein the first SIB is configured for a device with a different device category than a device for which the SIB-1 of the second set of SIBs is configured;
transmitting the first SIB a plurality of times within each radio frame of the plurality of radio frames transmitted by the base station; and
transmitting the second set of SIBs, including the SIB-1.

2. The method of claim 1, wherein the first SIB further comprises at least a subset of information comprised in the MIB.

3. The method of claim 1, wherein the first SIB comprises information that is not included in the second SIBs or the MIB.

4. The method of claim 1, wherein the first SIB is transmitted at a fixed location within each radio frame of the plurality of radio frames transmitted by the base station, wherein at least a subset of the second set of SIBs are transmitted at variable locations.

5. The method of claim 1, further comprising:
encoding the first SIB using a first type of encoding; and
encoding the second SIBs using a second type of encoding.

6. The method of claim 1, wherein the first SIB is transmitted using a fixed modulation and coding scheme.

7. The method of claim 1, wherein the first SIB comprises information specific to the different device category, wherein the information specific to the different device category comprises one or more of:
configuration information for common search space;
one or more locations of bands configured for use by the different device category within cell bandwidth; or
a number of bands configured for use by the different device category supported by the cell.

8. The method of claim 1, wherein the first SIB comprises information specific to the different device category, wherein the information specific to the different device category comprises one or more of:
a paging repetition factor for the different device category;
a physical random access channel (PRACH) repetition factor for the different device category; or
a random access request (RAR) repetition factor for the different device category.

9. The method of claim 1, wherein the SIB-1 is transmitted only once within each radio frame of the plurality of radio frames transmitted by the base station.

10. The method of claim 1, wherein transmitting the first SIB a plurality of times within each radio frame of the plurality of radio frames transmitted by the base station comprises transmitting the first SIB at dynamic locations in time, wherein the dynamic locations are based on a system frame number (SFN).

11. A user equipment device (UE), comprising:
a radio; and
a processing element operably coupled to the radio and configured to cause the UE to:
receive a master information block (MIB) from a base station that serves a cell, wherein the MIB indicates a location of a first system information block (SIB) of a first set of SIBs, the first SIB comprising at least one field of a SIB-1 of a second set of SIBs and at least one other field, wherein the first SIB is configured for a device with a different device category than a device for which the SIB-1 of the second set of SIBs is configured; and
receive the first SIB from the base station without receiving an SIB-1 from the base station, wherein the first SIB is transmitted a plurality of times within each radio frame of a plurality of radio frames transmitted by the base station during a first period of time.

12. The UE of claim 11,
wherein the first SIB has a fixed resource allocation within the central six resource blocks of the cell,
wherein at least a subset of the second set of SIBs have variable resource allocation.

13. The UE of claim 11, wherein the processing element is further configured to cause the UE to:
access the cell based at least in part on information comprised in the first SIB.

14. The UE of claim 11, wherein receiving the MIB comprises receiving the MIB in multiple subframes and/or multiple times within a subframe of each radio frame transmitted by the base station during the first period of time.

15. The UE of claim 11,
wherein the first SIB further comprises at least a subset of information comprised in the MIB.

16. An apparatus, comprising:
a processing element configured to cause user equipment device (UE) to:
receive a master information block (MIB) from a base station that serves a cell, wherein the MIB indicates a location of a first system information block (SIB) of a first set of SIBs, the first SIB comprising at least one field of a SIB-1 of a second set of SIBs and at least one other field, wherein the first SIB is configured for a device with a different device category than a device for which the SIB-1 of the second set of SIBs is configured; and
receive the first SIB from the base station without receiving an SIB-1 from the base station, wherein the first SIB is transmitted a plurality of times within each radio frame of a plurality of radio frames transmitted by the base station during a first period of time.

17. The apparatus of claim 16,
wherein the first SIB has a fixed resource allocation within the central six resource blocks of the cell,
wherein at least a subset of the second set of SIBs have variable resource allocation.

18. The apparatus of claim 16, wherein the processing element is further configured to cause the UE to:
access the cell based at least in part on information comprised in the first SIB.

19. The apparatus of claim 16, wherein receiving the MIB comprises receiving the MIB in multiple subframes and/or multiple times within a subframe of each radio frame transmitted by the base station during the first period of time.

20. The apparatus of claim 16,
wherein the first SIB further comprises at least a subset of information comprised in the MIB.

* * * * *